US006093470A

United States Patent [19]

Petri

[11] Patent Number: 6,093,470

[45] Date of Patent: Jul. 25, 2000

[54] GROMMET STRIP MANUFACTURING METHOD AND APPARATUS

[76] Inventor: Hector D. Petri, 384 Edmands Rd., Framingham, Mass. 01701

[21] Appl. No.: 09/419,599

[22] Filed: Oct. 18, 1999

Related U.S. Application Data

[62] Division of application No. 08/806,468, Feb. 26, 1997, Pat. No. 5,975,177.

[51] Int. Cl.[7] .......... B32B 3/26

[52] U.S. Cl. .......... 428/122; 49/462; 49/490.1; 52/716.8

[58] Field of Search .......... 428/122; 49/490.1, 49/462; 52/716.8, 717.03, 717.04, 717.05, 717.06

[56] References Cited

U.S. PATENT DOCUMENTS 4,769,966 9/1988 Petri .......... 52/716

*Primary Examiner*—Alexander Thomas

*Attorney, Agent, or Firm*—John E. Toupal; Harold G. Jarcho

[57] ABSTRACT

A grommet strip manufacturing apparatus including a supply mechanism for feeding a grommet strip; a feed mechanism for feeding a cushion strip; and a guide for joining the moving grommet and cushion strips into a composite strip so as to provide longitudinally aligned engagement between an engagement surface of the grommet strip and a contact surface of the cushion strip. Also included is a dispenser for dispensing an adhesive between the engagement surface of the grommet strip and the contact surface of the cushion strip; a compression assembly for maintaining, for a given length of the composite strip, compression between the engagement and contact surfaces; and a take up mechanism for receiving from the compression assembly the composite strip.

6 Claims, 5 Drawing Sheets

GROMMET STRIP MANUFACTURING METHOD AND APPARATUS

This application is a divisional of application Ser. No. 08/806,468 filed on Feb. 26, 1997, U.S. Pat. No. 5,975,177.

BACKGROUND OF THE INVENTION

This invention relates generally to a grommet strip for covering an exposed edge of a wall and, more particularly, to an electrically insulating grommet strip for covering the exposed edges of openings in electrical equipment housings.

Electrical equipment housings frequently possess openings for the passage of electrical wires. Generally, such openings are equipped with grommets or bushings that cover and insulate the exposed edges of the openings. A common grommet is made of rubber or a similar resilient material and consists of a pair of annular spaced apart flange portions internally joined by a cylindrical portion. The cylindrical portion projects through an opening and the flange portions engage the peripheral wall portions thereof. Disadvantages of such grommets include the requirement for large inventories to accommodate openings of various size, and their inapplicability to openings of other than circular shape.

The above problems are somewhat alleviated by a grommet strip having a flat, elongated base from opposite edge of which project longitudinally spaced apart fingers. The strip can be cut to desired length and then applied to an opening with the base engaging the edge of the opening and the fingers engaging peripheral portions thereof. Such a grommet strip is disclosed in British Patent No. 849,761. However, certain disadvantages persist for even the above described grommet strip. For example, the installation of the grommet strip into openings of complex shape requires the use of an adhesive and is, therefore, quite labor intensive.

An improved grommet strip that does not require the use of adhesives for installation is disclosed in U.S. Pat. No. 4,769,966. Although satisfactory for many applications, the grommet strips disclosed in that patent do have disadvantages in certain applications. For example, a U-shaped resilient channel covering the base of a metal strip exhibits an undesirable tendency to bulge transversely when applied to severely curved wall sections. Also, raw metal portions of the metal strip not covered by the resilient channel can damage the fingers of installers. Another grommet strip disclosed in the patent provides an electrostatic coating over the entire surface of a metal strip. In certain circumstances small diameter wires such as the fiber optic wires used in the communications industry can catch under castles in the stamped metal strip, particularly when the wires run parallel to a plane of the sheet metal to which the grommet is applied.

The object of this invention, therefore, is to provide an improved grommet for covering the exposed edges of openings in electrical housings.

SUMMARY OF THE INVENTION

The invention is a grommet strip manufacturing apparatus including a supply mechanism for feeding a grommet strip; a feed mechanism for feeding a cushion strip; and a guide for joining the moving grommet and cushion strips into a composite strip so as to provide longitudinally aligned engagement between an engagement surface of the grommet strip and a contact surface of the cushion strip. Also included is a dispenser for dispensing an adhesive between the engagement surface of the grommet strip and the contact surface of the cushion strip; a compression assembly for maintaining, for a given length of the composite strip, compression between the engagement and contact surfaces; and a take up mechanism for receiving from the compression assembly the composite strip. The compression assembly maintains engagement between the engagement and contact surfaces for a time period required for partial curing of the applied adhesive.

According to one feature of the invention, the compression assembly includes first and second rotating, parallel drums; the drums being shaped and arranged to form a coil with a given length of the composite strip. A surface portion of the first drum retains a first outer surface portion of the coil and a surface portion of the second drum retains a second outer surface portion of the coil with the second outer surface portion disposed diametrically opposite to the first outer surface portion. The first and second drum provide effective compressive forces between the moving grommet and cushion strip during curing of the adhesive.

According to another feature of the invention, the first drum has a cylindrical outer surface defining a plurality of annular axially spaced apart grooves, each groove retaining a different segment of the composite strip. The grooves function to effectively position the individual windings of the coil wound on the first and second drums.

According to yet another feature of the invention, the apparatus includes a control for maintaining a constant speed for the composite strip such that each increment of the composite strip is retained in the coil between the first and second drums for a predetermined time period. This feature insures uniform curing of the applied adhesive.

According to still another feature of the invention, the apparatus includes a sensor for detecting the presence of adhesive between the engagement and contact surfaces and a control for terminating strip feed in response to an absence of applied adhesive. This feature prevents the formation of composite strip with inadequately bonded grommet and cushion strips.

Also encompassed by the invention is a grommet strip manufacturing method including the steps of feeding a stamped spring tempered metal grommet strip; feeding a resilient cushion strip; dispensing an adhesive between an engagement surface of the grommet strip and a contact surface of the cushion strip; guiding the moving grommet and cushion strips into longitudinally aligned engagement between the engagement surface of the grommet strip and the contact surface of the cushion strip so as to form a composite strip; and maintaining for sequential lengths of the composite strip, compression between the engagement and contact surfaces. The method provides a composite strip with bonded engagement and contact surfaces.

According to one feature, the method includes the steps of winding the composite strip onto a take up reel, and maintaining on the composite strip on the reel pressure between the engagement and contact surfaces for a time period required to cure the adhesive. The pressurized curing period insures a solid bond.

According to still other features, the method includes the steps of detecting the presence of adhesive between the engagement and contact surfaces; and terminating movement of the composite strip in response to a failure to detect the presence of adhesive between said engagement and contact surfaces. This feature prevents formation of insecure bonds between the engagement and contact surfaces.

According to other features of the method, the maintaining step includes the steps of forming around first and second rotating parallel drums a coil out of each sequential length of the composite strip. The rotating drums maintain desired compression between the moving engagement and contact surfaces.

The invention also encompasses a edge of a wall and including a spring tempered metal strip with an elongated base portion and a plurality of discrete spaced apart finger portions extending in a common direction from each longitudinal edge of the base portion and substantially normal thereto, inner surfaces of the base and finger portions forming a first elongated channel with an open end opposite to the base portion. Also included in the strip are a resilient non metalic coating covering outer surface portions of the base and finger portions; and a resilient cushion strip defining a second elongated channel retaining the elongated base portion. The use of both a coating and a cushion strip obviates problems associated with prior grommet strips.

According to one feature of the grommet strip, the grommet strip has a uniform given height, and the cushion strip has a uniform predetermined height less than one-third (⅓) the given height. This feature eliminates undesirable transverse bulging of the cushion strip.

According to yet another feature, the method includes the step of maintaining a constant speed for the composite strip such that each sequential length of the composite strip is retained in the coil between the first and second drums for a predetermined time period. This feature insures uniform partial curing of the adhesive between the engagement and contact surfaces.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
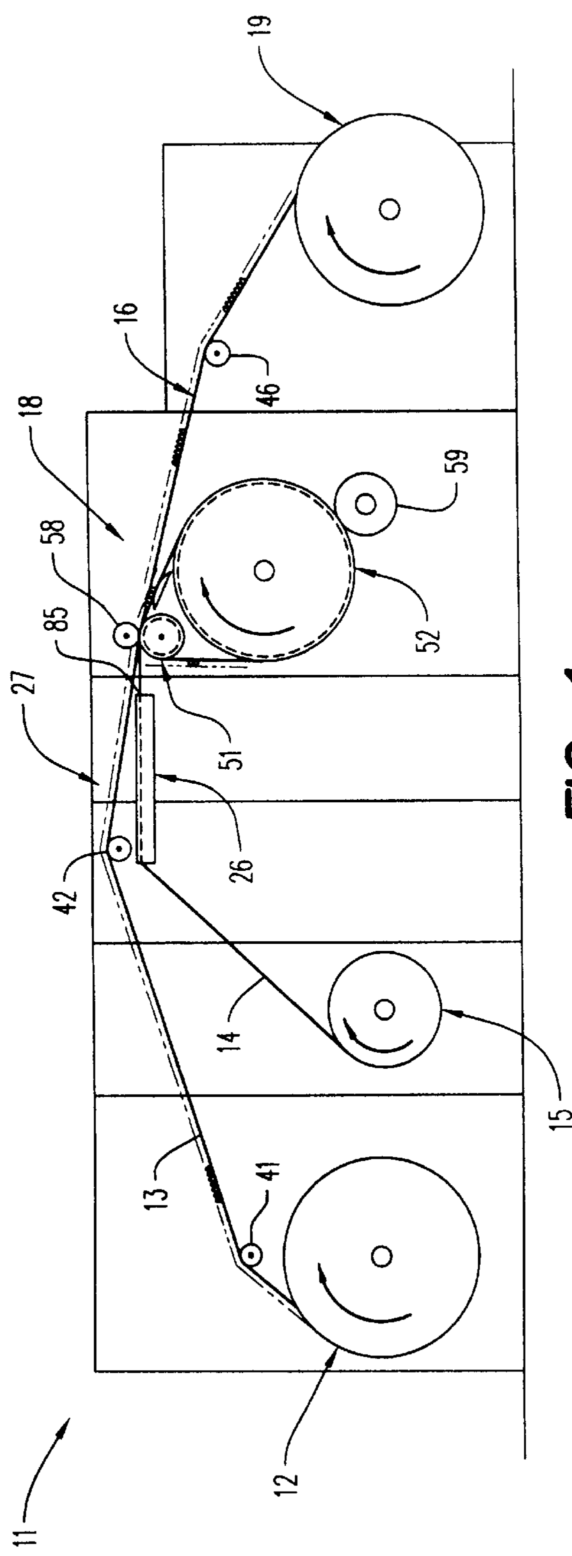
FIG. 1 is a schematic front elevational view of grommet strip manufacturing apparatus according to the invention.
Figure 2:
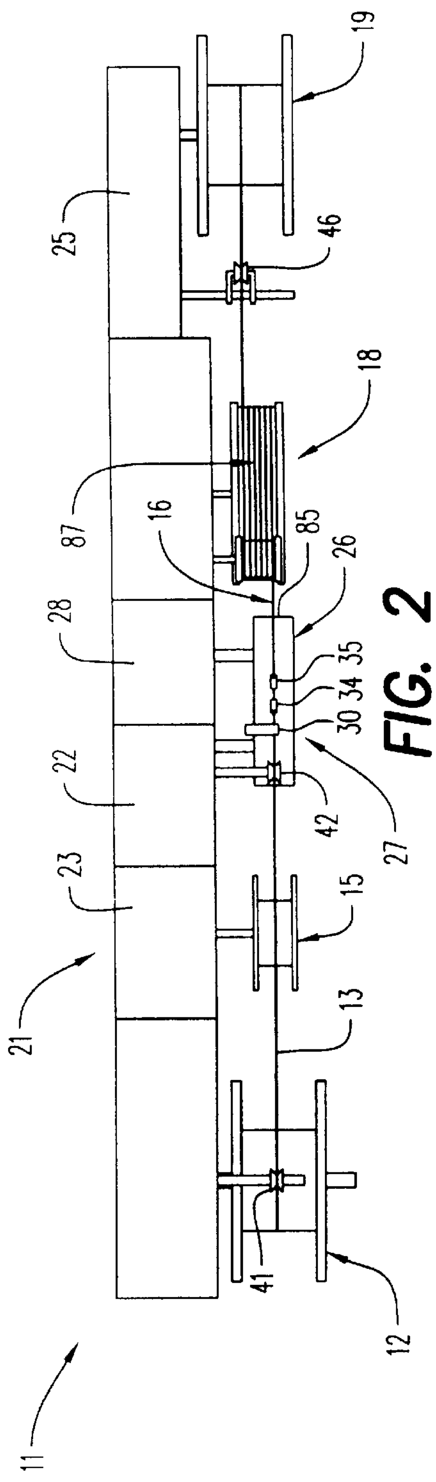
FIG. 2 is a schematic top view of the apparatus shown in FIG. 1.

Illustrated in FIGS. 1 and 2 is an apparatus 11 for producing grommet strips. A rotatable supply spool 12 feeds out a grommet strip 13 that is mated with a cushion strip 14 fed out by a rotatable feed spool 15 to provide a composite strip 16. Receiving the composite strip 16 is a compression mechanism 18 shown more clearly in FIGS. 10 and 11. A take up reel 19 receives the composite strip 16 from the compression mechanism 18.

A control system 21 includes a microprocessor 22 and an encoder 23 which control operation of the apparatus 11.

In response to the output of the encoder 23, the microprocessor 22 controls a multiple speed motor 25 that drives the take up reel 19 to produce a constant speed for the moving composite strip 16. Also controlled by the control system 21 is a adhesive dispensing station 27 (FIG. 3) that receives a suitable adhesive from a source 28.

Figure 3:
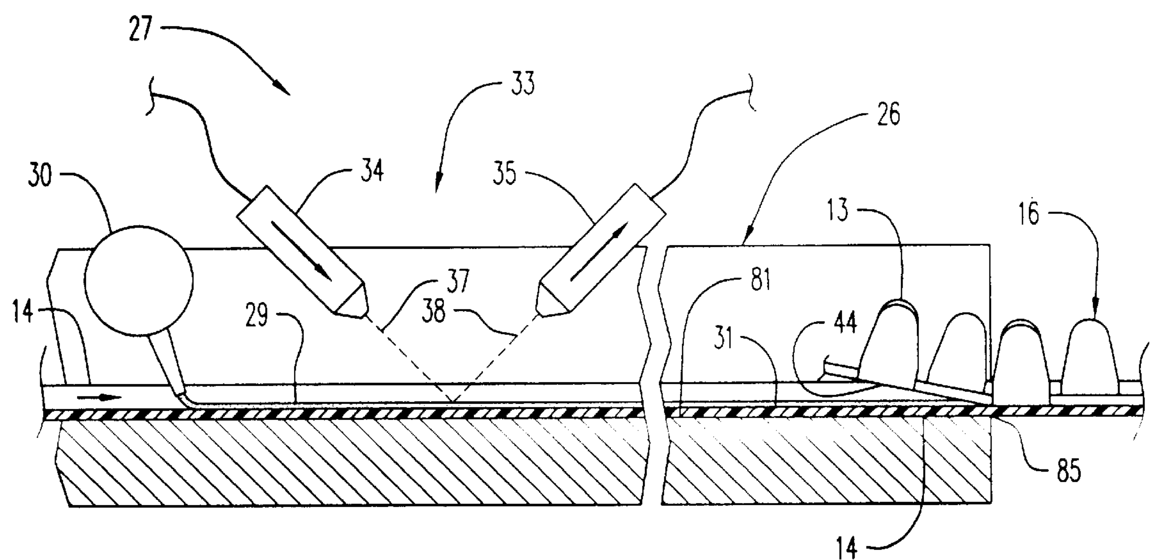
FIG. 3 is a detailed view of a portion of the apparatus shown in FIGS. 1 and 2.

The cushion strip 14 is fed from the feed spool 15 into a guide channel 26 in the adhesive dispensing station 27 shown in FIG. 3. Within the station 27 an adhesive nozzle 30 applies a bead 29 of adhesive onto an upper contact surface 31 of the moving cushion strip 14. The presence of adhesive 29 along the entire moving length of the cushion strip 14 is detected by a sensor 33 that includes a fiber optic light source 34 and a light detector 35. The light source 34 projects a light beam 37 at an internal angle of about 45° onto the moving bead of adhesive 29. Receiving light 38 reflected from the bead 29 is the detector 35. In response to a hiatus in the moving adhesive bead 29 on the contact surface 31, the detector 35 produces an output signal causing the control system 21 to deenergize the motor 25 and terminate movement of the strips 13, 14 and 16.

The grommet strip 13 leaving the supply spool 12 is guided by guide wheels 41, 42 into longitudinal alignment above the cushion strip 14 in the guide channel 26. Within the compression mechanism 18 an outer bottom engagement surface 44 (FIG. 4) of the grommet strip 13 engages the contact surface 31 of the cushion strip 14 via the adhesive bead 29 to form the composite strip 16 in a manner described hereinafter. Upon exiting the compression mechanism 18, the composite strip 16 is wound upon the take up spool 19 in an orderly manner by a traversing guide wheel 46.

Figure 10:
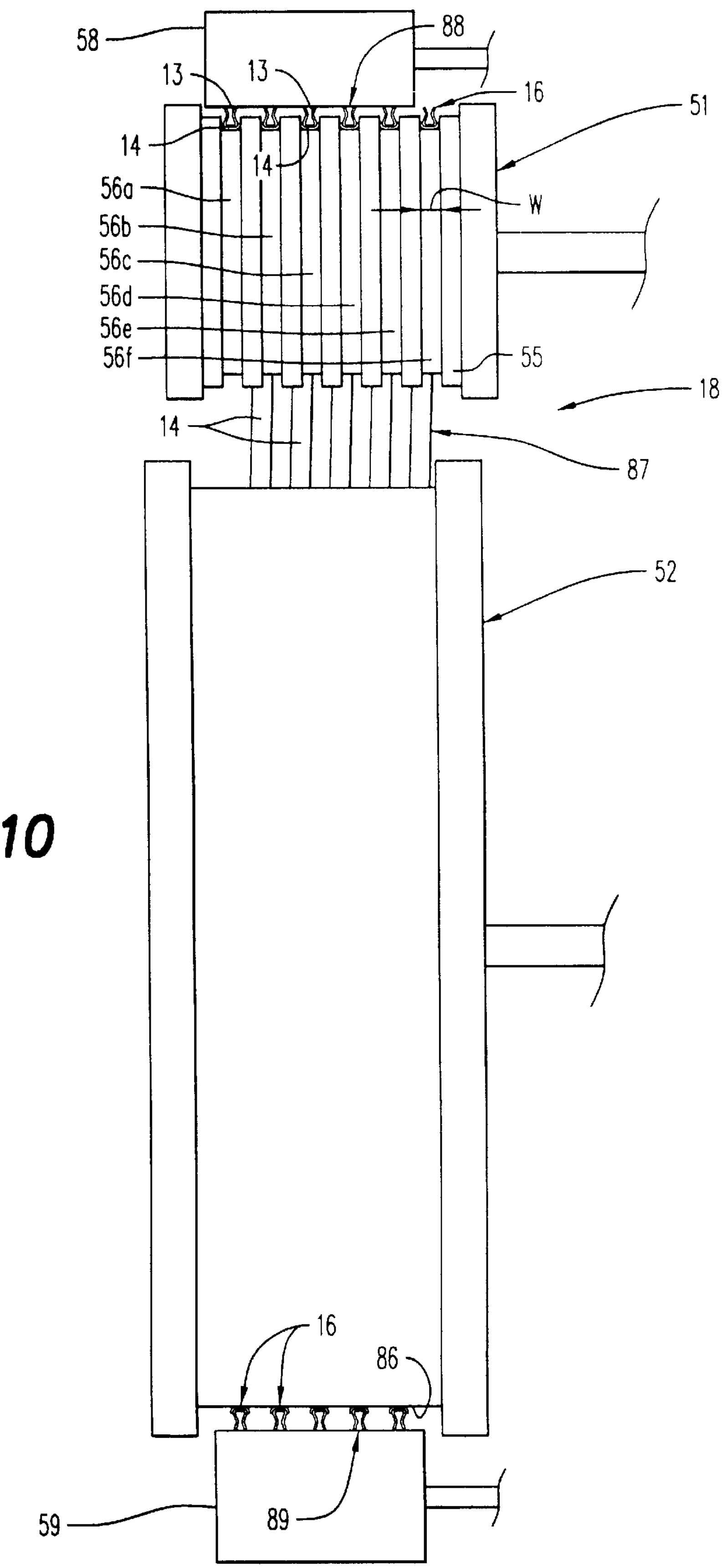
FIG. 10 is a detailed top view of a compression mechanism shown in FIGS. 1 and 2.
Figure 11:
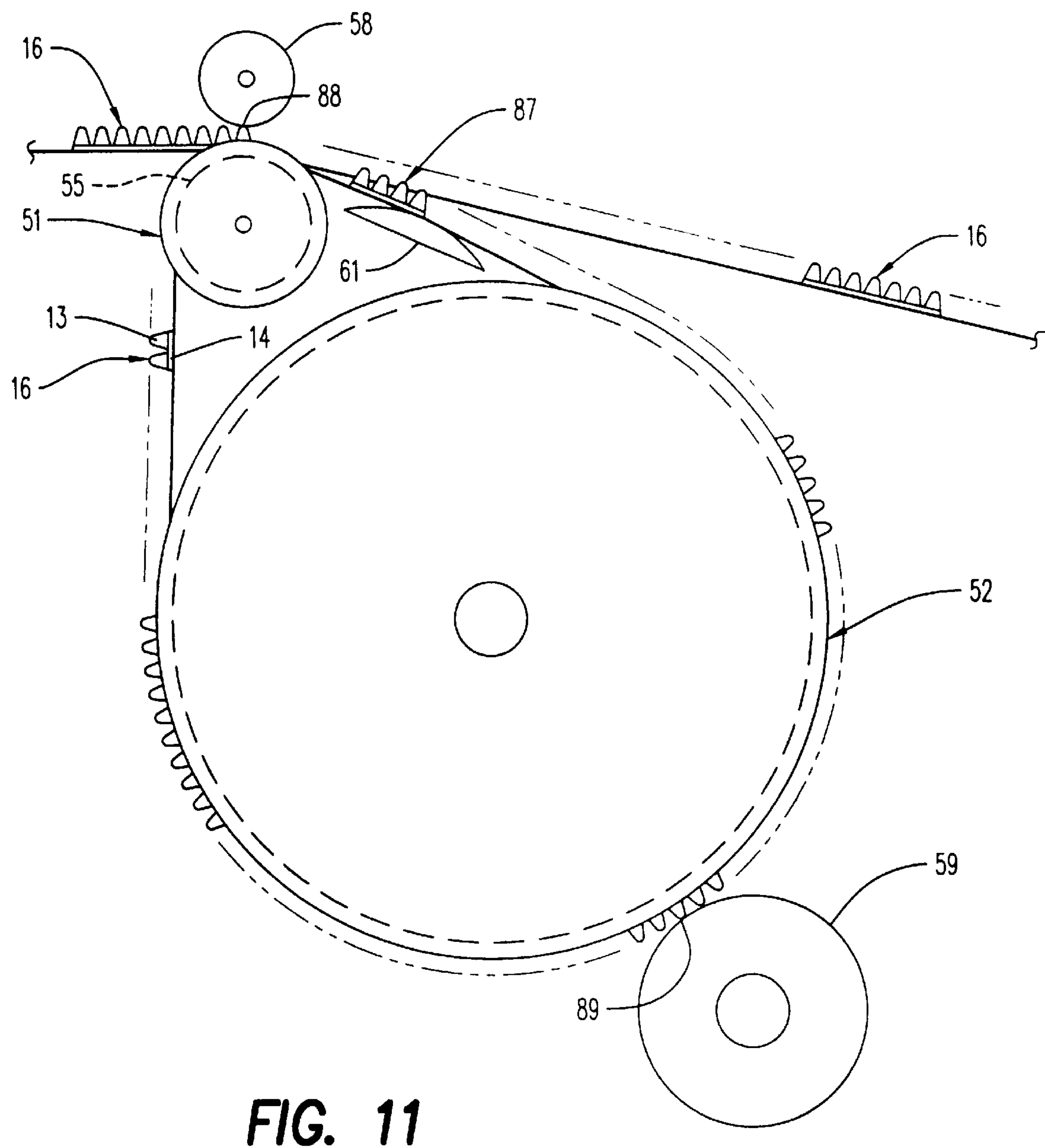
FIG. 11 is a right side view of the compression mechanism shown in FIG. 10.

As illustrated in FIGS. 10 and 11, the compression mechanism 18 includes a rotatable first drum 51 and a rotatable second drum 52 mounted below and with an axis parallel to the first drum 51. Formed in a cylindrical surface 55 of the first drum 51 are a plurality of axially spaced apart, annular grooves 56*a*–56*e*. Also included in the compression mechanism 18 are a pressure roller 58 mounted above and parallel to the first drum 51 and pressure roller 59 mounted below and parallel to the second drum 52. In addition, a shoe 61 is disposed between the first drum 51 and the second drum 52.

Figure 4:
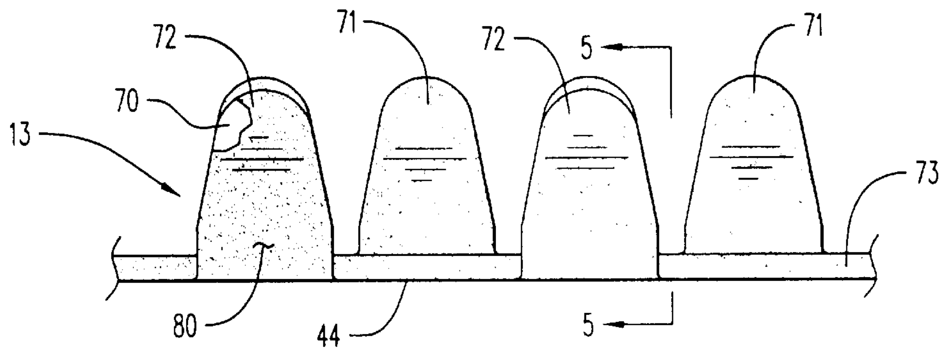
FIG. 4 is an elevational view of a grommet strip used in the apparatus.
Figure 5:
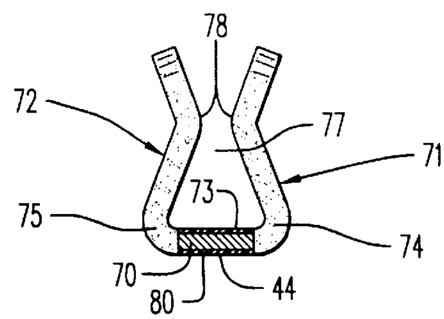
FIG. 5 is a cross-sectional view taken along lines 5—5 in FIG. 4.

As depicted in FIGS. 4 and 5, the U-shaped grommet strip 13 is a spring tempered metal stamping 70 having finger portions 71 extending orthogonally from one edge 74 of an elongated base strip 73 and finger portions 72 projecting orthogonally from an opposite edge 75 thereof. The finger portions 71 along the edge 74 are longitudinally spaced apart and alternate with the longitudinally spaced apart finger portions 72 along the edge 75. Together the base strip 73 and finger portions 71, 72 form a channel 77. Each of the finger portions 71, 72 has a V-shaped section with intermediate portions 78 projecting into the channel 77. After formation by a stamping and bending operation, the grommet strip 13 preferably is coated with a suitable, resilient, non-metallic coating 80 such as a thermo-setting or thermo-plastic polymer. The coating 80 can be applied, for example, as an electrostatic spray and then fused to the metal strip 70 by exposure to heat in an oven.

Figure 6:
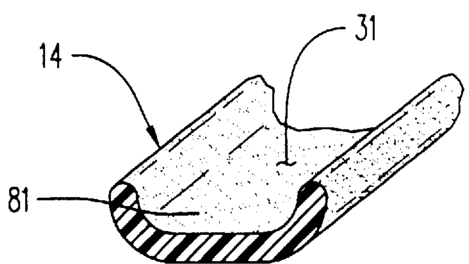
FIG. 6 is a perspective view of a cushion strip used in the apparatus.
Figure 7:
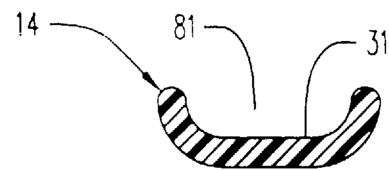
FIG. 7 is a cross-sectional view taken along lines 7—7 in FIG. 6.
Figure 8:
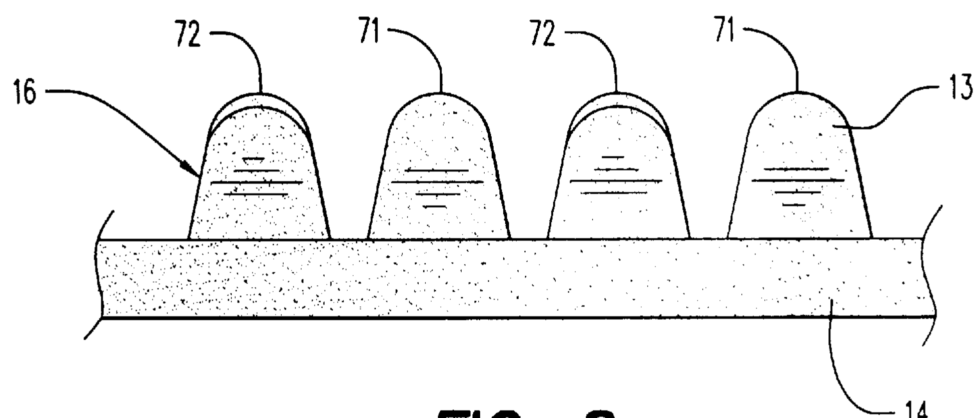
FIG. 8 is an elevational view of a composite strip formed with the strips shown in FIGS. 4–7.
Figure 9:
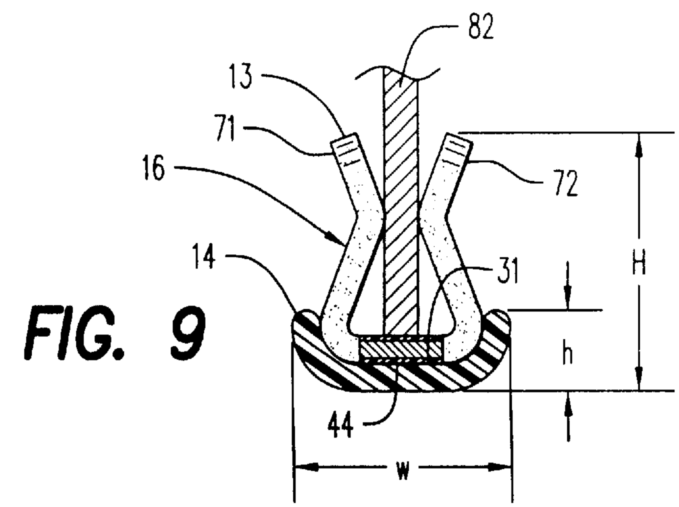
FIG. 9 is a cross-sectional view taken along lines 9—9 in FIG. 8.

As shown in FIGS. 6 and 7, an elongated extrusion formed of a suitable polymer such as urethane. The strip 14 has a U-shaped cross-section so as to form a channel 81 having an inner bottom contact surface 31. After being longitudinally combined in the compression mechanism 18, the grommet strip 13 and cushion strip 14 form the composite strip 16 having the form depicted in FIGS. 8 and 9. The channel 81 of the cushion strip 14 receives the elongated base strip 73 of the grommet strip 13 and the engagement surface 44 of the grommet strip 13 engages the contact surface 31 of the cushion strip 14 and is secured thereto by the adhesive 29.

Preferably, the height H of the cushion strip 14 is less than one-third (⅓) the height H of the composite strip 16 and, preferably, about one-fifth (⅕) thereof. Limiting the relative height of the cushion strip 14 reduces a tendency of the strip to bulge transversely when the composite strip 16 is secured to a sharply curved edge portion of an opening in a housing wall 82 shown with dashed lines in FIG. 9.

To initiate operation of the apparatus 11, a suitable leader (not shown) is attached to an outer end of the grommet strip 13 and threaded over the guide rollers 41, 42; an outer end 85 of the guide channel 31 and into the compression mechanism 18. Next, the leader is inserted into a top portion of the groove 56*a* in the first drum 51, wound around a bottom cylindrical 86 of the second drum 82, into an upper portion of the groove 56*b* in the first drum 51, around the bottom surface 86 of the second drum 82, into an upper portion of the groove 56*a* in the first drum 51, around the bottom surface 86 of the second drum 52, into an upper portion of the groove 56*d* in the first drum 51, around the bottom surface 86 of the second drum 52, into an upper portion of the groove 56*e* of the first drum 51, around the bottom surface 86 of the second drum 52 and into an upper surface portion of the groove 56*f* in the first drum 51 before being attached to the take up spool 19.

Activation of the take up spool 19 then draws the grommet strip along the path formerly occupied by the leader. The control system 21 is adjusted to provide for the grommet strip 13 a tension of about sixty pounds. When the outer end of the grommet strip 13 reaches the outer edge 85 of the guide channel 31, an end of the cushion strip 14 is threaded between the grommet strip 13 and the guide channel 31 and frictional forces resulting therebetween force the base 73 of the grommet strip 13 into the channel 81 of the cushion strip 14 producing engagement between the engagement surface 44 and the contact surface 31. The resultant composite strip 16 is drawn by the take up spool 19 around the first and second drums 51, 52 to form thereon a composite strip coil 87 (FIG. 11) having a first outer surface portion 88 formed by upper portions of the grooves 56*a*–56*f* of the first drum 51 and a second oppositely directed outer coil surface 89 formed by the lower cylindrical surface 86 of the second drum 52. As the winding segments of the coil 87 traverse the first and second drums 51, 52, the tension applied to the composite strip 16 creates a compressive force which is applied between the engaged contact surface 31 of the cushion strip 14 and the engagement surface 44 of the grommet strip 13. The compressive forces are enhanced by the shoe 61 which maintains a given tension on the composite strip 16, the pressure roller 58 that engages outer longitudinal edges of the grommet strip 13 to force the cushion strip portion 14 of the composite strip 16 into the slots 56*a*–56*e* and the pressure roller 59 that engages outer longitudinal edges of the grommet strip 13 to press the composite strips against the lower surface 86 of the second drum 52. Compression between the engagement surface 44 and contact surface 31 is maintained for each segment of the composite strip 16 for a time period sufficient to obtain a tack of the applied adhesive 29. That result is insured by the maintenance of a constant linear speed for the composite strip 16 so as to establish a predetermined uniform time of residence in the compression mechanism 18 for each segment of the moving composite strip 16. That residence time is equal to the total length of the composite strip coil 87 divided by the linear speed thereof. In a preferred embodiment of the invention, a residence time of about 2.5 minutes is provided. At the completion of a run, several turns of a wire leader at the rear end of the grommet strip 13 are wrapped around the take up spool 19 and secured thereto to maintain a compressive pressure on the wound composite strip 16 for a minimum period of twelve hours to assure a full cure of the adhesive 29.

In a preferred embodiment of the invention, the composite strip 16 has a uniform width W (FIG. 9) slightly greater than a uniform width W (FIG. 10) of the grooves 56*a–f* in the first drum 51. When wound as a coil 87 around the first and second drums 51, 52, the resilient cushion strip 14 is forced into the grooves 56*a–f* by the pressure roller 58. The resultant compression of the cushion strip creates in the channel 81 pressure that distributes the applied adhesive 29 over the entire engaged surfaces 31, 44 of, respectively, the cushion strip 14 and the grommet strip 13. Accordingly, a secure bond is provided between the strips 13 and 14.

Obviously, many modifications and variations of the present invention are possible in light of the above teachings. It is to be understood, therefore, that the invention can be practiced otherwise than as specifically described.

What is claimed is:

1. A grommet strip for mounting along an exposed edge of a wall and comprising:

a spring tempered metal strip comprising an elongated base portion and a plurality of discrete spaced apart finger portions extending in a common direction from each longitudinal edge of said base portion and substantially normal thereto, inner surfaces of said base and finger portions forming a first elongated channel with an open end opposite to said base portion and adapted to receive the edge of the wall with said inner surface of said base portion engaging the exposed edge and said inner surfaces of said finger portions engaging marginal sections of the wall directly adjacent thereto;

a resilient non metallic coating covering outer surface portions of said base and finger portions; and a resilient cushion strip defining a second elongated channel said resilient cushion strip retaining said elongated base portion in said second elongated channel.

2. A grommet strip according to claim 1 wherein said finger portions extending from one of said edges are longitudinally displaced with respect to said finger portions extending from the other of said edges so as to be transversely non aligned therewith.

3. A grommet strip according to claim 2 wherein each of said finger portions comprises a bottom edge fixed to one of said longitudinal edges, a top edge substantially shorter than said bottom edge, and side edges that project into said first elongated channel between said bottom and top edges.

4. A grommet strip according to claim 1 wherein said grommet strip has a uniform given height, and said cushion strip has a uniform predetermined height less than one-third (⅓) said given height.

5. A grommet strip according to claim 4 wherein said finger portions extending from one of said edges are longitudinally displaced with respect to said finger portions extending from the other of said edges so as to be transversely non aligned therewith.

6. A grommet strip according to claim 5 wherein each of said finger portions comprises a bottom edge fixed to one of said longitudinal edges, a top edge substantially shorter than said bottom edge, and side edges that project into said first elongated channel between said bottom and top edges.

* * * * *